Sept. 18, 1928.
F. HINNEKENS
1,684,396
REENFORCED FLANGE
Filed Nov. 4, 1926
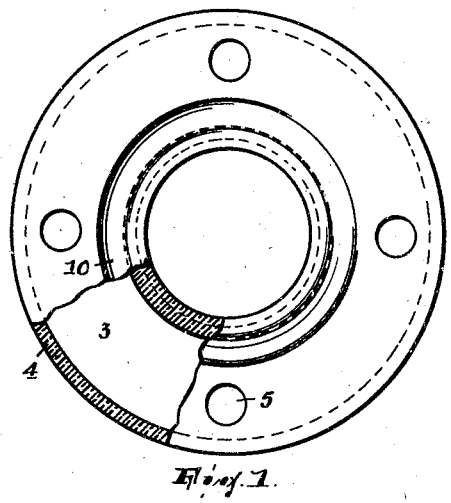
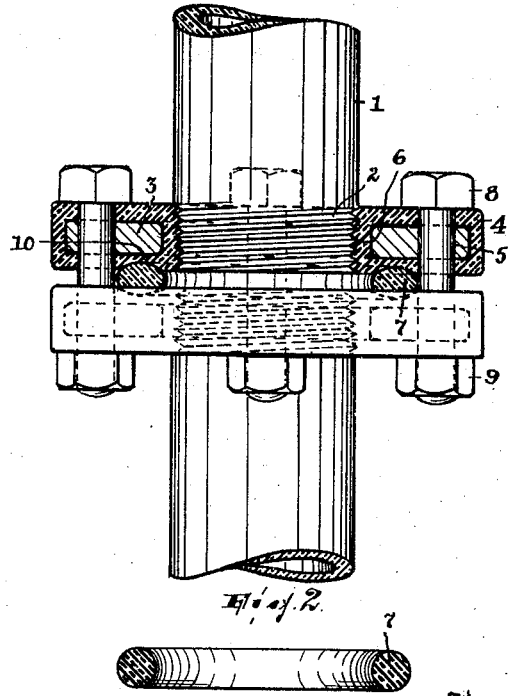
WITNESS
Wm L Bell
INVENTOR,
Florent Hinnekens,
BY
John Pinward
ATTORNEY Patented Sept. 18, 1928.

1,684,396

UNITED STATES PATENT OFFICE.

FLORENT HINNEKEN, OF PATERSON, NEW JERSEY.

REENFORCED FLANGE.

Application filed November 4, 1926. Serial No. 146,162.

This invention relates to connections or unions between parts of fluid conductors, and especially fluid conductors which have to be formed of rubber or rubber composition in order to resist the action of the fluid conducted, as the pipes used in dye houses to conduct certain chemical liquids which if contaminated by foreign substances are likely to stain the fabrics being treated. Heretofore, where a pipe, for example, has to be joined to another pipe or a tank it has been customary to screw a collet of hard rubber onto the suitably threaded end of the pipe to form a flange thereon and then, the flange having suitable holes for the purpose, draw the pipe up to the other pipe, tank or equivalent element by bolts passed through said holes, having first interposed a yielding gasket as a packing element. Tightening up the bolts frequently strained the flange to the point of fracture, thus weakening if not destroying the joint and of course disturbing the seal; in fact, one reason why the flange was formed as a separate element or collet screwed onto the pipe was the likelihood of its being fractured in forming the joint and the necessity, in consequence, of its thus being removable so that a new one could be then substituted.

One object of this invention is to provide a collet to be used as a flange for a pipe which shall be exteriorly of hard rubber but reenforced so that it cannot be fractured in use. Another object is to construct a collet to be used as a flange for a pipe so that it will facilitate the preliminary arranging in position for sealing of a yielding gasket of a form to attain a perfect sealing with the minimum of pressure exerted on the parts for that purpose.

In the drawing,

Fig. 1 is an underneath plan of the collet, with its hard rubber exterior portion broken away;

Fig. 2 is a side elevation of a joint formed between two pipes having the improved collet, one of which and the gasket appear in section; and Fig. 3 is a section of the preferred form of gasket employed.

In the present example the union is formed between two similar pipes, and the following description of one pipe and its collet will serve for the other:

1 designates a hard rubber pipe which at the end thereof adjoining the joint to be formed has an exterior screw-thread 2 formed thereon.

The collet to form the flange on pipe 2 is formed as follows: 3 is a flat annular core of some hard, non-fracturable substance, as steel, and 4 is a hard rubber annular shell in which the annulus 3 is encased. At suitable intervals around the axis of the collet it is formed with holes 5 for the clamping bolts. This shell completely encases the core and it actually covers all surfaces of the core except those in the holes 5, and the shell, which is itself annular in form, has at one peripheral surface thereof a screw-thread 6, in this case formed in its inner peripheral surface and so as to conform or fit the thread 2 of the pipe 1. The object in forming the shell so as not to cover the surface of the core within each bolt hole 5 is to retain such (metal and hence non-fracturable) surface to assume directly the pressure which the received metal bolt may exert thereon: if the material of the shell covered the surfaces of the core within these holes the binding and pinching action of the bolts would result in breaking away pieces of and fracturing the shell which would not necessarily be confined to the holes but would in most cases extend to portions of the shell exterior of the holes and if any such portion happened to be one directly concerned in the forming of the seal the integrity of such seal would be impaired. The collet may be formed by molding the hard rubber shell on the core and then tapping the thread 6 therein.

7 indicates the yielding gasket to be placed between the collect which thus forms the flange on the pipe and the other part concerned in the joint, as the similar flange of another such pipe. 8 denotes the metal bolts which are passed through the holes 5 and are equipped with nuts 9 for clamping the parts together and so compressing the gasket and forming the seal.

In order to produce an hermetic seal with the minimum of clamping pressure I preferably use a yielding (as soft rubber) gasket which presents rounded opposite or sealing surfaces, as the gasket shown in Fig. 3, which in any radius thereof presents a substantially circular cross-section. When this gasket undergoes compression it is designed that in any radial section thereof it shall be free to expand radially of the pipe both inwardly and outwardly, wherefore it should initially stand between the compressing parts in a definite relation (as concentric) to the other parts. To hold it in this position until the clamping pressure can be brought to bear I preferably provide the collet with a circumferential groove 10 in one plane face thereof.

The thickness of the hard rubber shell 4 is substantially uniform throughtout, and as the core is flat the collet as a whole is flat; wherefore, except in that form thereof in which the groove 11 exists in one plane face of the collet, either of such faces may be used as the sealing face of the collet.

An important feature of the invention is the flat form of the core and the flat form of the ultimate collet and the fact that the thickness of the shell is less than that of the core; when so formed the device can withstand heavy pressure without danger of fracturing or crushing the shell.

Having thus fully described my invention what I claim and desire to secure by Letters Patent is:

A peripherally threaded collet to have a screw-threaded engagement with and thus form a union-flange on one of two conductor parts to be joined comprising a metal annular core and a hard rubber annular shell and having holes for clamping devices extending substantially parallel with its axis and penetrating the core and shell, said shell completely encasing the core but leaving the metal of the core exposed within the holes.

In testimony whereof I affix my signature.

FLORENT HINNEKEN.

CERTIFICATE OF CORRECTION.

Patent No. 1,684,396.  Granted September 18, 1928, to

It is hereby certified that the name of the patentee in the above numbered patent is erroneously written and printed as "Florent Hinneken," whereas said name should have been written and printed as "Florent Hinnekens"; and that the said Letters Patent should be read with this correction therein that the same may conform to the record of the case in the Patent Office.

Signed and sealed this 6th day of November, A. D. 1928.

(Seal)

M. J. Moore,
Acting Commissioner of Patents.